(12) United States Patent
Zhao et al.

(10) Patent No.: US 9,728,932 B2
(45) Date of Patent: Aug. 8, 2017

(54) FIBER COUPLED MODULAR LASER SYSTEM

(71) Applicant: Advanced Optowave Corporation, Ronkonkoma, NY (US)

(72) Inventors: Xiaojie Zhao, Stony Brook, NY (US); Chun He, Fremont, CA (US)

(73) Assignee: Advanced Optowave Corporation, Ronkonkoma, NY (US)

( * ) Notice: Subject to any disclaimer, the term of this patent is extended or adjusted under 35 U.S.C. 154(b) by 0 days.

(21) Appl. No.: 14/545,033

(22) Filed: Mar. 18, 2015

(65) Prior Publication Data
US 2016/0276798 A1  Sep. 22, 2016

(51) Int. Cl.
*H01S 3/23* (2006.01)
*H01S 3/067* (2006.01)
*H01S 3/0941* (2006.01)
*H01S 3/113* (2006.01)
*H01S 3/06* (2006.01)

(52) U.S. Cl.
CPC .......... *H01S 3/2375* (2013.01); *H01S 3/2341* (2013.01); *H01S 3/0602* (2013.01); *H01S 3/0675* (2013.01); *H01S 3/06754* (2013.01); *H01S 3/06758* (2013.01); *H01S 3/09415* (2013.01); *H01S 3/113* (2013.01)

(58) Field of Classification Search
CPC .. H01S 3/06754; H01S 3/2308; H01S 3/2316; H01S 3/2325
See application file for complete search history.

(56) References Cited

U.S. PATENT DOCUMENTS

| | | | | |
|---|---|---|---|---|
| 5,045,669 A | * | 9/1991 | Ortiz, Jr. | B23K 26/032 219/121.61 |
| 6,072,811 A | * | 6/2000 | Fermann | H01S 3/1118 372/105 |
| 7,711,025 B2 | | 5/2010 | Schmitz et al. | |
| 8,135,050 B1 | * | 3/2012 | Stadler | H01S 3/0057 372/31 |
| 8,254,417 B2 | | 8/2012 | Gapontsev et al. | |
| 2003/0193711 A1 | * | 10/2003 | Hildebrand | H04B 10/118 359/333 |
| 2011/0310468 A1 | * | 12/2011 | Hertwig | H01S 3/2341 359/341.3 |
| 2012/0026504 A1 | * | 2/2012 | Yamada | H01S 3/06791 356/479 |
| 2014/0050234 A1 | | 2/2014 | Ter-Mikirtychev | |
| 2015/0049987 A1 | | 2/2015 | Grasso et al. | |
| 2016/0104995 A1 | * | 4/2016 | Savage-Leuchs | G02B 6/02347 359/341.4 |

\* cited by examiner

*Primary Examiner* — Eric Bolda
(74) *Attorney, Agent, or Firm* — Suganda Jutamulia (57) ABSTRACT

A fiber coupled modular laser system comprises a laser oscillator, at least one fiber pre-amplifier, and at least one free space solid state power amplifier. The output of the laser oscillator is fiber coupled with the input of the at least one fiber pre-amplifier or the at least one free space solid state power amplifier. The output or the input of the at least one fiber pre-amplifier is fiber coupled with the input or the output of the at least one free space solid state power amplifier.

19 Claims, 6 Drawing Sheets

FIBER COUPLED MODULAR LASER SYSTEM

FIELD OF THE INVENTION

This invention relates to fiber coupled modular laser systems and more specifically to fiber coupled modular laser systems comprising laser oscillators, fiber pre-amplifiers, and free space solid state power amplifiers.

BACKGROUND OF THE INVENTION

High power lasers are used for laser cutting, welding, and folding of metals and polymers. High peak power and nanosecond pulses enable effective marking and engraving. The additional power and better beam quality provide cleaner cut edges and faster cutting speeds. A high power laser system may comprise an oscillator, multiple stages of fiber pre-amplifiers, and free space solid state power amplifiers. The oscillator sets the laser's wavelength, pulse width, and repetition rate, while the fiber amplifiers boost the laser power to a required level. The last module of the high power laser includes a free space solid state power amplifier for power amplifying the laser beam received from the fiber pre-amplifier.

In the current high power laser system, the laser light exiting from the fiber pre-amplifier propagates in free space entering the free space solid state power amplifier. The alignment between the fiber pre-amplifier and the free space solid state power amplifier is critical. An offset angle on the order of 0.1 degree may sufficiently degrade the power of the output laser light. Accordingly, high power laser systems requiring less critical alignment are desired.

The positions of the fiber pre-amplifier and the free space solid state power amplifier are fixed to keep the required alignment. The available space is often not suitable or not enough for the position setting of the fiber pre-amplifier and the free space solid state power amplifier. Accordingly, high power laser systems having fiber pre-amplifier and free space solid state power amplifiers that can be setup with flexibility are also desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
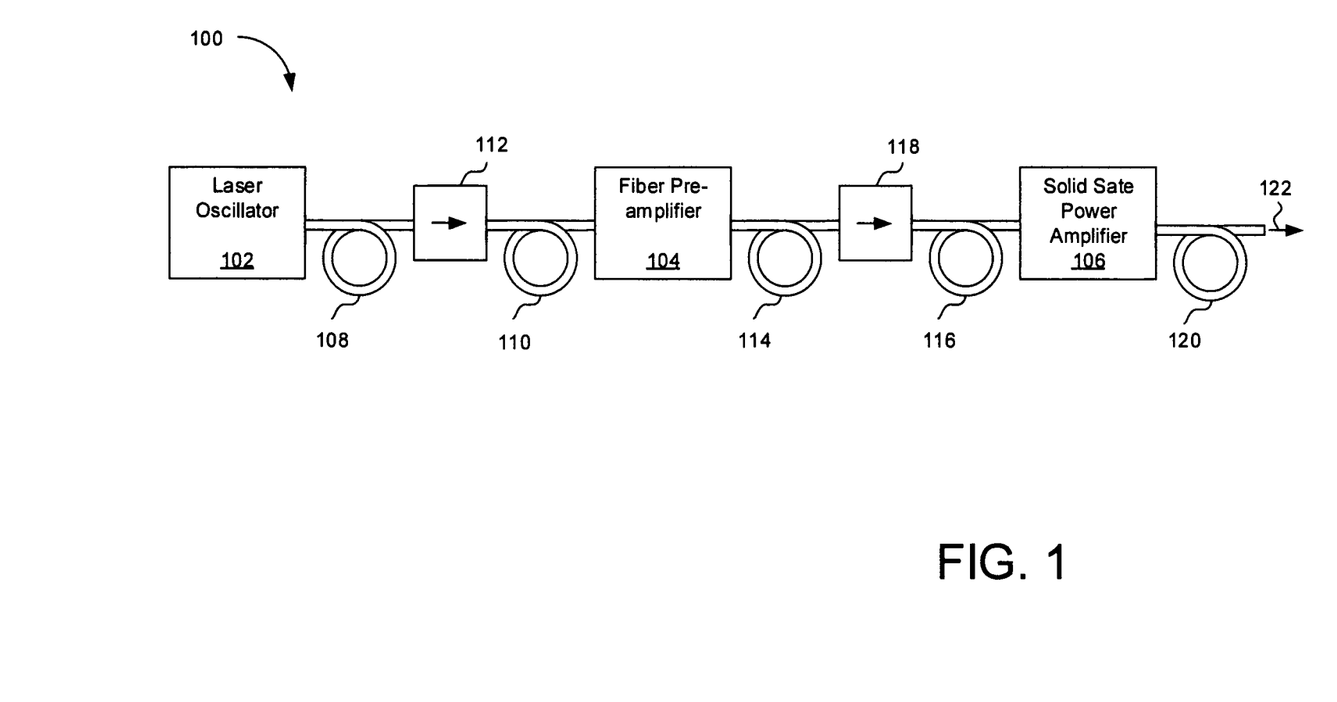
FIG. 1 shows an exemplary schematic diagram of a fiber coupled modular laser system according to an embodiment of the present invention.

FIG. 1 shows an exemplary schematic diagram of a fiber coupled modular laser system 100, according to an embodiment of the present invention. Fiber coupled modular laser system 100 comprises a laser oscillator 102, a fiber pre-amplifier 104, and a free space solid state power amplifier 106. Laser oscillator 102 and fiber pre-amplifier 104 are coupled by fibers 108 and 110. A first fiber isolator 112 may be disposed between fibers 108 and 110. Fiber pre-amplifier 104 and free space solid state power amplifier 106 are coupled by fibers 114 and 116. A second fiber isolator 118 may be disposed between fibers 114 and 116. An output fiber 120 is coupled to free space solid state power amplifier 106 to deliver an output laser light 122.

A feature of fiber coupled modular laser system 100 is that the laser system comprises a plurality of modular subsystems. The modular subsystems are coupled using fibers. The subsystems may be placed on a table. The positions of the subsystems are flexible, since they are coupled with fibers. In other words, the subsystems may not be fixed and aligned on a surface. The subsystems may be stacked to save the space, while they are coupled using fibers.

Furthermore, since the laser light is confined within the coupling fibers, the loss caused by the misalignment of laser light in free space may be reduced. If the laser light exiting from fiber pre-amplifier 104 is coupled into free space solid state power amplifier 106 in free space, in other words, if the laser light exiting from fiber pre-amplifier 104 propagates in free space and then enters free space solid state power amplifier 106, offset angle of the laser light on the order of 0.1 degree from the correct alignment may sufficiently degrade the output power of the laser system.

The subsystems may include a laser oscillator that produces laser pulses determining the laser's wavelength, pulse width, and repetition rate. The laser oscillator may also produce a continuous laser light. The subsystems may also include a fiber pre-amplifier to boost the laser power of the produced laser pulses to a required level. The fiber pre-amplifier may include multiple fiber amplifiers in tandem. Each fiber amplifier may increase the laser power by a limited factor, typically a factor between a few to a few tens.

The last module of the fiber coupled modular laser system includes a free space solid state power amplifier for power amplifying the laser beam received from the fiber pre-amplifier. In contrast to conventional free space solid state amplifiers or lasers, the free space solid state power amplifier in the fiber coupled modular laser system includes an input coupling fiber and an output coupling fiber. The module of free space solid state power amplifier may be coupled using a fiber to receive an input laser light. After the received input laser light is amplified by the free space solid state power amplifier, the amplified laser light may be outputted through an output coupling fiber. Since the coupling fibers are flexible, the module may be placed in any desired position.

The fiber coupled modular laser system is not limited to the example disclosed in FIG. 1. The order of the fiber pre-amplifier and the solid state power amplifier may be reversed. Furthermore, the laser system may include more than one fiber pre-amplifiers and more than one solid state power amplifiers, which may be arranged in any suitable orders.

Figure 2:
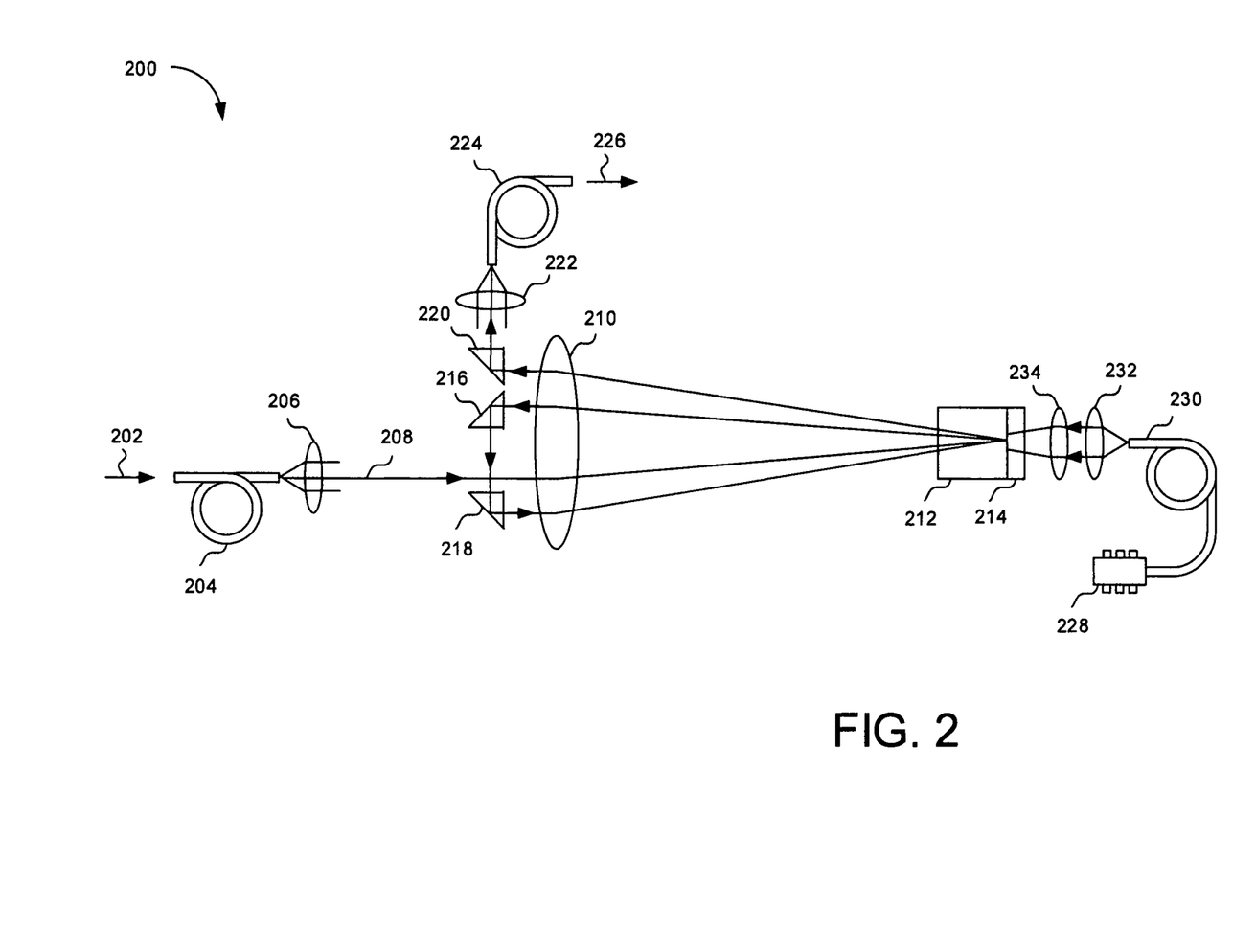
FIG. 2 shows an exemplary free space solid state power amplifier according to an embodiment of the present invention.

FIG. 2 shows an exemplary free space solid state power amplifier 200, according to an embodiment of the present invention. An input laser light 202 is inputted to free space solid state power amplifier 200 through an input coupling fiber 204, which may be fiber 116 of FIG. 1. The laser light emitted through input coupling fiber 204 is collimated by a first fiber coupling lens 206 becoming a collimated light 208. First fiber coupling lens 206 may be included in a fiber collimator. Collimated light 208 is focused by a focusing lens 210 onto a solid state active medium 212. Solid state active medium 212 may be a solid state crystal, rod, or disk. Solid state active medium 212 may be made of neodymium-doped yttrium aluminum garnet (Nd:YAG), neodymium-doped glass (Nd:glass), and ytterbium-doped glasses, and the like.

An end mirror 214 reflects the incoming focused laser light to a first prism 216 through focusing lens 210. The incoming laser light is amplified by solid state active medium 212 when it travels through solid state active medium 212. The reflected laser light is collimated by focusing lens 210. First prism 216 reflects the collimated laser light to a second prism 218. Second prism 218 reflects the collimated laser light back to solid state active medium 212 through focusing lens 210. Focusing lens 210 focuses the reflected collimated laser light onto solid state active medium 212. End mirror 214 reflects the incoming focused laser light from second prism 218 to a third prism 220 through focusing lens 210. It is appreciated that free space solid state power amplifier 200 may include more than two prisms, e.g., prism 216 and 218, before the laser light is directed to third prism 220.

The reflected laser light is collimated by focusing lens 210. Third prism 220 reflects the collimated laser light to a second fiber coupling lens 222. Second fiber coupling lens 222 may be included in a fiber collimator. Second fiber coupling lens 222 focuses the collimated laser light into an output coupling fiber 224. Output coupling fiber 224 may be fiber 120 of FIG. 1. Output coupling fiber 224 delivers an amplified output laser light 226, which has the same wavelength, pulse width, and repetition rate as input laser light 202, but the power of input laser light 202 has been amplified. It is appreciated that prisms 216, 218, and 220 may be replaced with any reflectors such as mirrors or beam directors such as gratings, holographic optical elements (HOEs), and the like.

A pump light source 228 emits a pump light, which is coupled by a pump light coupling fiber 230 to free space solid state power amplifier 200. The pump light emitted from pump light coupling fiber 230 is collimated by a pump light coupling lens 232. The pump light collimated by lens 232 is focused by a pump light focusing lens 234 on the rear end of solid state active medium 212 through end mirror 214. End mirror 214 is transmissive at pump light wavelengths and reflective at laser light wavelength. A plurality of pump light sources may replace a single pump light source to provide higher power of pump light. Pump light source 228 may be a laser diode or a LED.

Figure 3:
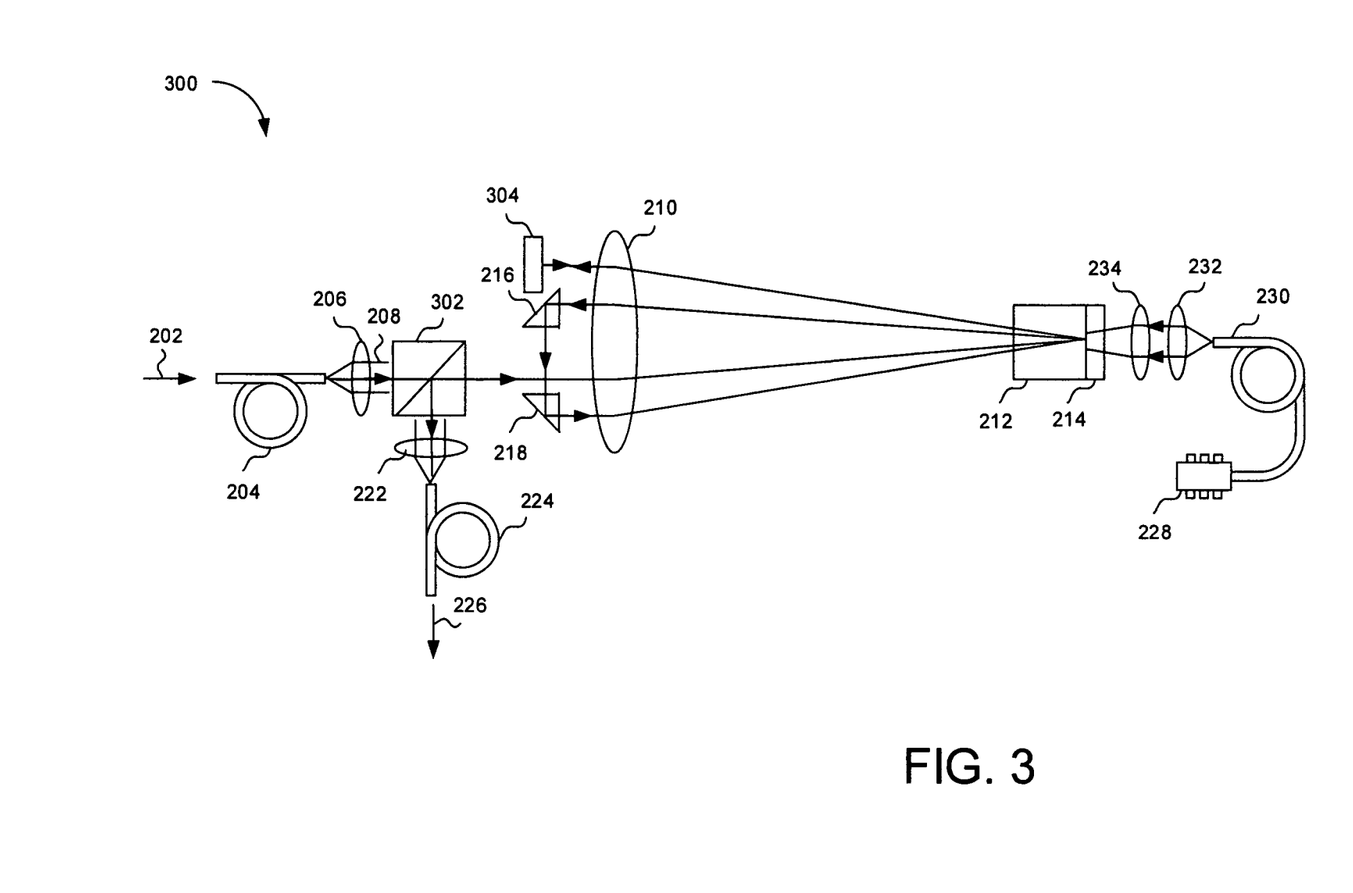
FIG. 3 shows an alternative exemplary free space solid state power amplifier according to an embodiment of the present invention.

FIG. 3 shows an alternative exemplary free space solid state power amplifier 300 nearly identical to free space solid state power amplifier 200 of FIG. 2 according to an embodiment of the present invention. For brevity, detailed descriptions of identical portions are omitted. The difference of FIG. 3 from FIG. 2 is that free space solid state power amplifier 300 comprises a beamsplitter 302 that transmits collimated laser light 208 to focusing lens 210, and a mirror 304 replacing third prism 220. Mirror 304 reflects the incoming collimated laser light to solid state active medium 212. The reflected collimated laser light is eventually incident to beamsplitter 302. Beamsplitter 302 reflects the collimated amplified laser light to output coupling lens 224, which couples the amplified light into output coupling fiber 224. Output coupling fiber 224 delivers an amplified output laser light 226.

Every time the laser light is passing in solid state active medium 212, the laser light is amplified by solid state active medium 212, which transfers the energy of pump light illuminating from rear end of solid state active medium. Accordingly, various optical systems may be applied, which facilitates the laser light having a large number of passages in solid state active medium 212 to produced stronger amplified output laser light 226.

It is appreciated that FIGS. 2 and 3 are only two examples. In general, a free space solid state power amplifier includes a solid state active medium for amplifying the input laser light, a pump light source and related optics for providing pump light, an optical system providing multi passes of the laser light in the solid state active medium. According to an embodiment of the present invention, the free space solid state power amplifier further comprises an input coupling fiber and an output coupling fiber. The input laser light is fiber coupled to enter the free space solid state power amplifier by the input coupling fiber, and the output laser light is fiber coupled to exit from the free space solid state power amplifier by the output coupling fiber. Therefore, the free space solid state power amplifier may not have to be fixed and aligned with the previous stage of fiber pre-amplifier and the target that receives the output laser light. A solid state power amplifier may not have a pair of reflectors that form a lasing cavity.

Figure 4:
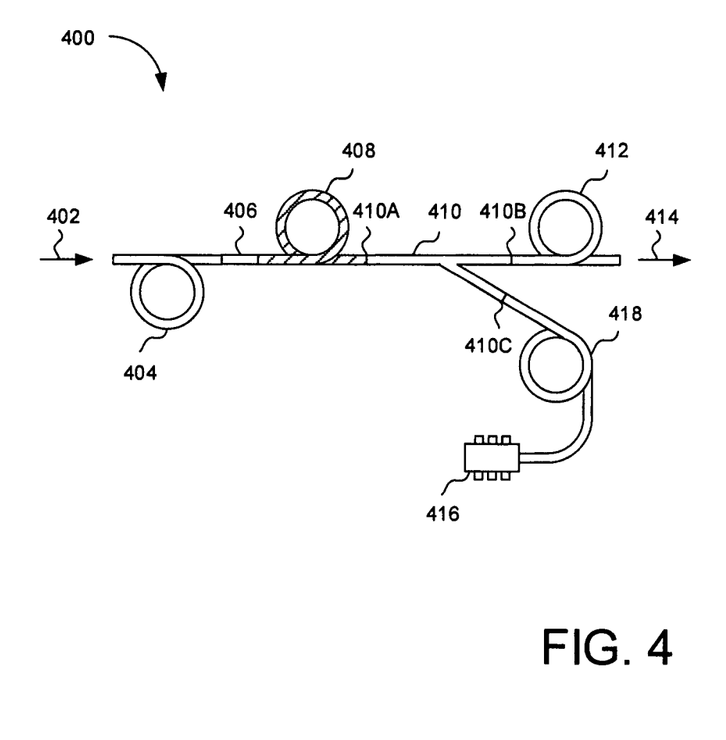
FIG. 4 shows an exemplary fiber pre-amplifier according to an embodiment of the present invention.

FIG. 4 shows an exemplary fiber pre-amplifier 400, according to an embodiment of the present invention. An input laser light 402 is inputted to fiber pre-amplifier 400 through an input coupling fiber 404, which may be fiber 110 of FIG. 1. Light transmitted through input coupling fiber 404 is coupled to an active fiber 408, which comprises active medium, through a fiber coupler 406. Active fiber 408 may be made of Yb3+ doped silica fiber, Er3+ doped silica fiber, and the like. Active fiber 408 is coupled to a first port 410A of a Y-coupler 410. An output coupling fiber 412 is coupled to a second port 410B of Y-coupler 410. Output coupling fiber 412 delivers pre-amplified output laser light 414.

A pump light source 416 emits a pump light, which is coupled by a pump light coupling fiber 418 to a third port 410C of Y-coupler 410. The pump light is coupled to active fiber 408 through Y-coupler 410. Y-coupler 410 may be a wavelength division multiplexer (WDM). The pump light propagates through fiber amplifier 408 in a direction against the propagation of the pre-amplified laser light in active fiber 408. The pump light is absorbed by the active fiber, in turn, the input laser light is amplified by the active fiber. A plurality of pump light sources may replace a single pump light source to provide higher power of pump light. Pump light source 416 may be a laser diode or a LED. The input laser light is fiber coupled to enter the fiber pre-amplifier, and the amplified laser light is fiber coupled to exit from the fiber pre-amplifier. A fiber pre-amplifier may not have a pair of reflectors that form a lasing cavity.

Figure 5:
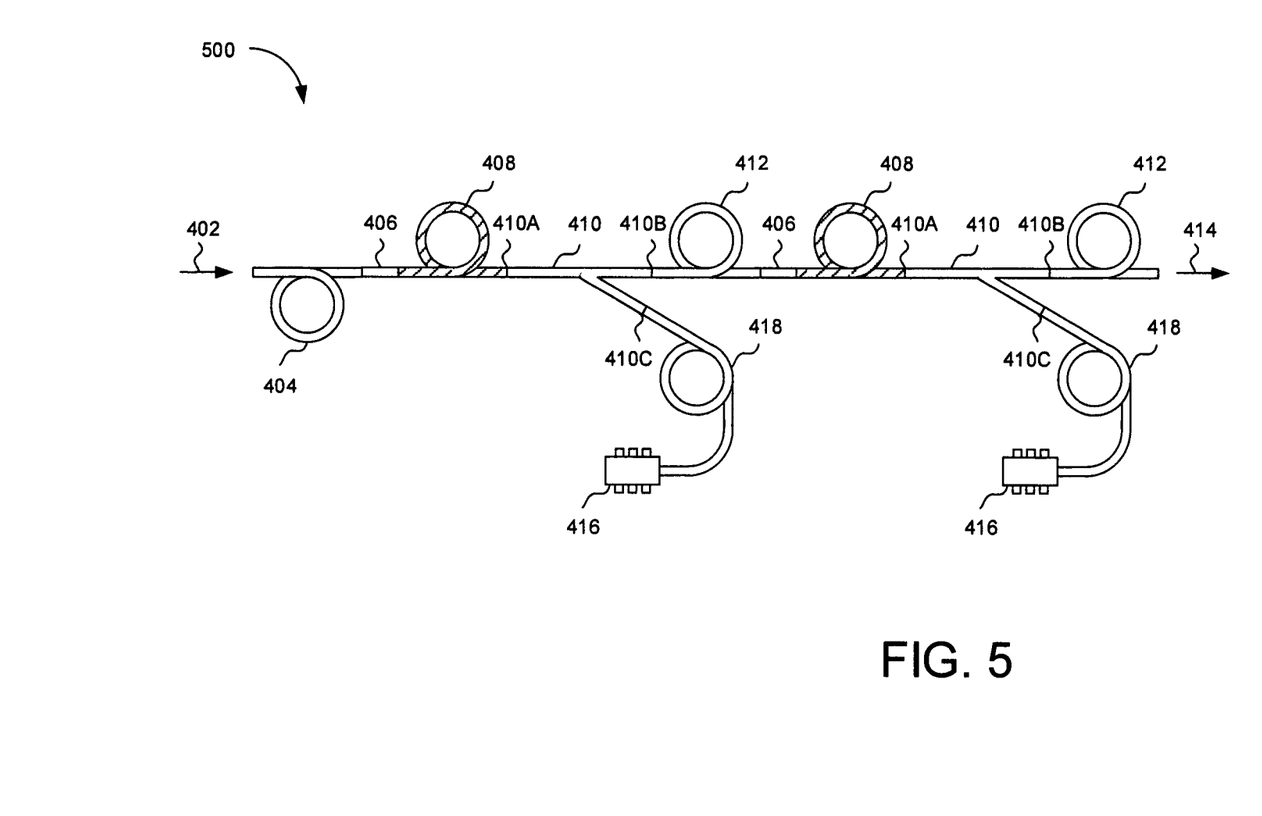
FIG. 5 shows an alternative exemplary fiber pre-amplifier according to an embodiment of the present invention.

FIG. 5 shows an alternative exemplary fiber pre-amplifier 500 nearly identical to fiber pre-amplifier 400 of FIG. 4 according to an embodiment of the present invention. For brevity, detailed descriptions of identical portions are omitted. The difference of FIG. 5 from FIG. 4 is that fiber pre-amplifier 500 comprises two stages of fiber pre-amplifier, each stage of fiber pre-amplifier has an active fiber 408. It is appreciated that FIGS. 4 and 5 are only two examples. In an embodiment, multiple fiber pre-amplifiers may be used in tandem to produce stronger pre-amplified laser light.

In an embodiment, a polarization based multipass laser amplifier as disclosed in a co-pending patent application Ser. No. 13/999,936, entitled, Multipass Fiber Amplifiers, may be used, which is incorporated herein by reference.

Figure 6:
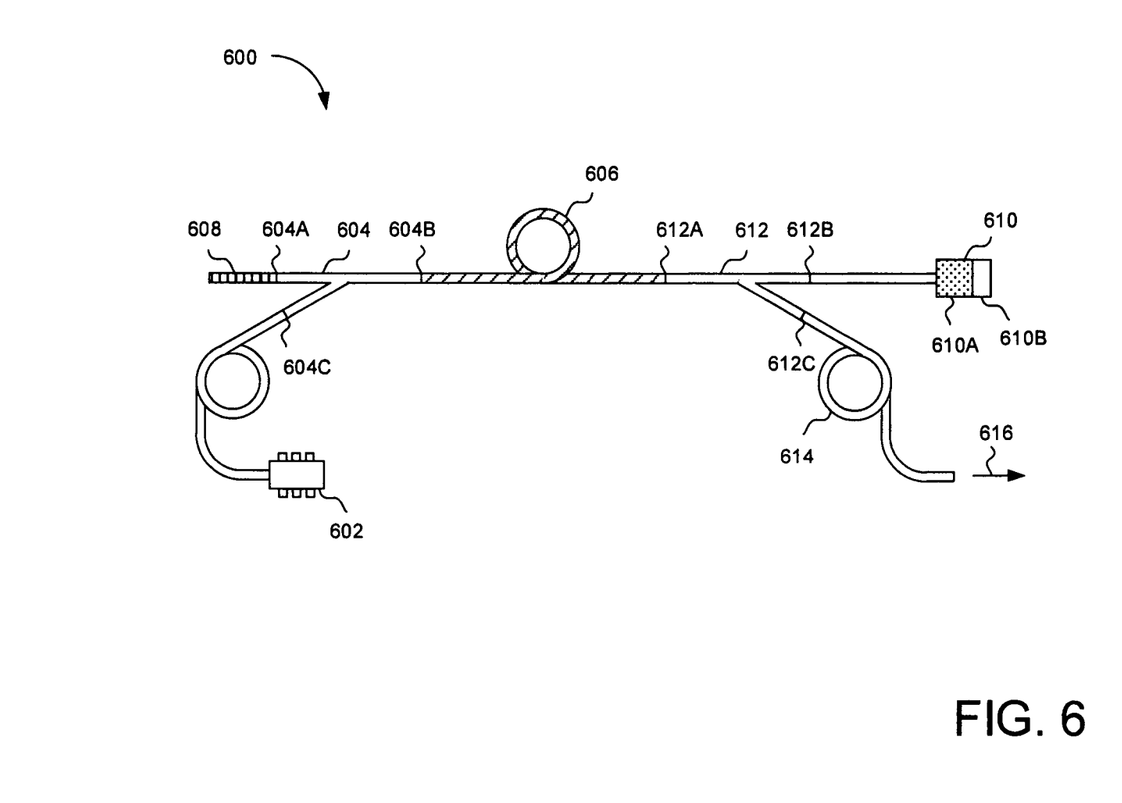
FIG. 6 shows an exemplary laser oscillator according to an embodiment of the present invention.

FIG. 6 shows an exemplary laser oscillator, which is a fiber master oscillator 600, according to an embodiment of the present invention. Any laser oscillator may be used as well. A pump light source 602 emits pump light at wavelength $\lambda 1$, which is coupled to a pump channel 604C of a Y-coupler 604. Y-coupler 604 may be a wavelength division multiplexer (WDM). Pump light source 602 may be a laser diode or a LED. An active fiber (gain fiber) 606 is coupled to a common channel 604B of Y-coupler 604. The pump light is absorbed in active fiber 606 and excites electrons to the upper state of the active medium in active fiber 606. When the electrons recombine to the ground state, a stimulated light pulse having wavelength $\lambda 2$ ($\lambda 2 > \lambda 1$) is generated. If the active fiber is made of Yb3+ doped silica fiber, the wavelength of the emitted light $\lambda 2$ is around 1 µm. If the active fiber is made of Er3+ doped silica fiber, the wavelength of the emitted light $\lambda 2$ is around 1.5 µm. Other active fibers are also possible.

Fiber master oscillator 600 comprises a wavelength selective reflector 608 and a saturable absorber mirror 610 forming a lasing cavity. The light pulse travels from active fiber 606 to wavelength selective reflector 608 through common channel 604B and exiting from a lasing channel 604A of Y-coupler 604. Wavelength selective reflector 608 reflects only the portion of light that is both within the gain spectrum of active fiber 606 and within the reflection pass band of wavelength selective reflector 608. For example, wavelength selective reflector 608 may be a fiber Bragg grating (FGB), which may be designed to reflect light at a specific center wavelength with a determined pass band. In addition, a FBG may perform dispersion compensation to combat the fiber non-linearities intrinsically in a fiber master oscillator.

The light reflected by wavelength selective reflector 608 passes Y-coupler 604 once again and travels in active fiber 606. The light is amplified by active fiber 606 and continues traveling to a power splitter 612 through a common port 612A. Portion of light passes through lasing port 612B of power splitter 612 and is incident on saturable absorber mirror 610. An absorber 610A of saturable absorber mirror 610 becomes saturated at high intensities, thus allowing the majority of the cavity energy to pass through absorber 610A to a mirror 610B of saturable absorber mirror 610, where it is reflected back into the laser cavity. At low intensities, the absorber is not saturated, and absorbs all incident energy, effectively removing it from the laser cavity. Moreover, due to the absorption of the pulse front side, the pulse width is slightly decreased during reflection. Portion of lasing light 616, which is the output laser light, exits from exit port 612C of power splitter 612 through an output coupling fiber 614. Output coupling fiber 614 may be fiber 108 of FIG. 1.

It is appreciated that FIG. 6 is only for example. In an embodiment, another type of laser oscillator may be used. In any embodiment, the laser oscillator provides laser pulses determining the laser's wavelength, pulse width, and repetition rate of the amplified laser beam produced by the free space solid state power amplifier.

A fiber coupled modular laser system comprising a laser oscillator, at least one fiber pre-amplifier, and at least one free space solid state power amplifier is disclosed. The output of the laser oscillator is fiber coupled with the input of the at least one fiber pre-amplifier or the at least one free space solid state power amplifier. The output or the input of the at least one fiber pre-amplifier is fiber coupled with the input or the output of the at least one free space solid state power amplifier.

Accordingly, a method for making fiber coupled modular laser system comprising: (a) providing a laser oscillator; (b) providing at least one fiber pre-amplifier; (c) providing at least one free space solid state power amplifier; (d) fiber coupling the output of the laser oscillator with the input of the at least one fiber pre-amplifier or the at least one free space solid state power amplifier; and (e) fiber coupling the output or the input of the at least one fiber pre-amplifier with the or the output of the at least one free space solid state power amplifier.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially. For the disclosed apparatuses, the order of elements may be changed while the operation principle is the same.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A fiber coupled modular laser system comprising;
    a laser oscillator;
    at least one fiber pre-amplifier; and
    at least one free space solid state power amplifier;
    wherein an output of the laser oscillator is fiber coupled with an input of the at least one fiber pre-amplifier;

wherein an output of a fiber pre-amplifier is fiber coupled with an input of a free space solid state power amplifier; and wherein an output of the at least one free space solid state power amplifier is fiber coupled to exit from the modular laser system and to deliver the output of the at least one free space solid state power amplifier to a target.

2. The fiber coupled modular laser system of claim 1, wherein the laser oscillator comprises:
   a pump light source for emitting a pump light;
   an active fiber for absorbing the pump light and generating a laser light;
   a wavelength selective reflector and a saturable absorber mirror for forming a lasing cavity;
   a Y-coupler for coupling the pump light to the active fiber; and
   a power splitter for outputting the laser light;
   wherein the generated laser light is fiber coupled to enter an input of one of the at least one fiber pre-amplifier and the at least one free space solid state power amplifier.

3. The fiber coupled modular laser system of claim 2, wherein the Y-coupler is a wavelength division multiplexer (WDM).

4. The fiber coupled modular laser system of claim 2, wherein the wavelength selective reflector is a Bragg grating.

5. The fiber coupled modular laser system of claim 1, wherein the at least one fiber pre-amplifier comprises:
   a pump light source for emitting pump light;
   an active fiber for absorbing the pump light and amplifying an input laser light;
   a Y-coupler for coupling the pump light to the active fiber;
   an input coupling fiber for inputting the input laser light; and
   an output coupling fiber for outputting an amplified laser light;
   wherein the input laser light is fiber coupled to enter the fiber pre-amplifier, and the amplified laser light is fiber coupled to exit from the fiber pre-amplifier.

6. The fiber coupled modular laser system of claim 5, wherein the Y-coupler is a wavelength division multiplexer (WDM).

7. The fiber coupled modular laser system of claim 1, wherein the at least one free space solid state power amplifier comprises:
   a solid state active medium for amplifying an input laser light;
   a focusing lens for focusing the input laser light onto the solid state active medium;
   a plurality of reflectors for providing multi passes of the input laser light in the solid state active medium;
   a pump light source for emitting a pump light;
   an end mirror at an rear end of the solid state active medium for reflecting the input laser light and passing the pump light;
   an input coupling fiber for inputting the input laser light; and
   an output coupling fiber for outputting an output laser light;
   wherein the end mirror is transmissive at a pump light wavelength and reflective at an input light wavelength; and
   wherein the input laser light is fiber coupled to enter the free space solid state power amplifier, and the output laser light is fiber coupled to exit from the free space solid state power amplifier.

8. The fiber coupled modular laser system of claim 7, wherein the at least one free space solid state power amplifier further comprises:
   a first fiber coupling lens for collimating the input laser light inputted by the input coupling fiber; and
   a second fiber coupling lens for focusing the output laser light into the output coupling fiber.

9. The fiber coupled modular laser system of claim 7, wherein the solid state active medium is one of solid state crystal, solid state rod, and solid state disk.

10. The fiber coupled modular laser system of claim 7, wherein the plurality of reflectors comprises prisms.

11. The fiber coupled modular laser system of claim 7, wherein the pump light source is one of a laser diode and a LED.

12. A free space solid state power amplifier comprising:
   a solid state active medium for amplifying an input laser light;
   a focusing lens for focusing the input laser light onto the solid state active medium;
   a plurality of reflectors for providing multi passes of the input laser light in the solid state active medium;
   a pump light source for emitting a pump light;
   an end mirror at an rear end of the solid state active medium for reflecting the input laser light and passing the pump light;
   an input coupling fiber for inputting the input laser light; and
   an output coupling fiber for outputting an output laser light;
   wherein the end mirror is transmissive at a pump light wavelength and reflective at an input light wavelength;
   wherein the input laser light is fiber coupled to enter the free space solid state power amplifier, and the output laser light is fiber coupled to exit from the free space solid state power amplifier; and
   wherein the output laser light exiting from the free space solid state power amplifier is received by a target.

13. The free space solid state power amplifier of claim 12 further comprising:
   a first fiber coupling lens for collimating the input laser light inputted by the input coupling fiber; and
   a second fiber coupling lens for focusing the output laser light into the output coupling fiber.

14. The free space solid state power amplifier of claim 12, wherein the solid state active medium is one of solid state crystal, solid state rod, and solid state disk.

15. The free space solid state power amplifier of claim 12, wherein the plurality of reflectors comprises prisms.

16. The free space solid state power amplifier of claim 12, wherein the pump light source is one of a laser diode and a LED.

17. A method for making fiber coupled modular laser system comprising:
   providing a laser oscillator;
   providing at least one fiber pre-amplifier; and
   providing at least one free space solid state power amplifier;
   fiber coupling an output of the laser oscillator with an input of the at least one fiber pre-amplifier;
   fiber coupling an output of a fiber pre-amplifier with an input of a free space solid state power amplifier; and
   fiber coupling an output of the at least one free space solid state power amplifier to exit from the modular laser system and to deliver the output of the at least one free space solid state power amplifier to a target.

18. The method for making fiber coupled modular laser system of claim 17 further comprising:

providing a solid state active medium for amplifying an input laser light;

providing a focusing lens for focusing the input laser light onto the solid state active medium;

providing a plurality of reflectors for providing multi passes of the input laser light in the solid state active medium;

providing a pump light source for emitting a pump light;

providing an end mirror at an rear end of the solid state active medium for reflecting the input laser light and passing the pump light;

providing an input coupling fiber for inputting the input laser light;

providing an output coupling fiber for outputting an output laser light;

fiber coupling the input laser light to enter the free space solid state power amplifier; and fiber coupling the output laser light to deliver from the free space solid state power amplifier;

wherein the end mirror is transmissive at a pump light wavelength and reflective at an input light wavelength.

19. The method for making fiber coupled modular laser system of claim 18 further comprising:

providing a first fiber coupling lens for collimating the input laser light inputted by the input coupling fiber; and providing a second fiber coupling lens for focusing the output laser light into the output coupling fiber.

* * * * *